US012284397B2

(12) United States Patent
Di Castro et al.

(10) Patent No.: US 12,284,397 B2
(45) Date of Patent: Apr. 22, 2025

(54) LOSSY COMPRESSION OF VIDEO CONTENT INTO A GRAPH REPRESENTATION

(71) Applicant: Robert Bosch GmbH, Stuttgart (DE)

(72) Inventors: Dotan Di Castro, Haifa (IL); Eitan Kosman, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 97 days.

(21) Appl. No.: 17/937,220

(22) Filed: Sep. 30, 2022

(65) Prior Publication Data

US 2023/0115248 A1    Apr. 13, 2023

(30) Foreign Application Priority Data

Oct. 8, 2021   (EP) .................................... 21201632

(51) Int. Cl.
  *H04N 19/90*   (2014.01)
  *H04N 19/172*  (2014.01)
  *H04N 19/186*  (2014.01)

(52) U.S. Cl.
  CPC .......... *H04N 19/90* (2014.11); *H04N 19/172* (2014.11); *H04N 19/186* (2014.11)

(58) Field of Classification Search
  CPC ..... H04N 19/90; H04N 19/172; H04N 19/186
  USPC .................................................. 375/240.25
  See application file for complete search history.

(56) References Cited

U.S. PATENT DOCUMENTS

| 11,908,180 B1* | 2/2024 | Ho ......................... G06V 10/82 |
| 2014/0362240 A1* | 12/2014 | Klivington ........... H04N 23/683 |
| | | 348/208.1 |
| 2016/0155024 A1* | 6/2016 | Partis ..................... G06V 20/35 |
| | | 382/173 |
| 2016/0171707 A1* | 6/2016 | Schwartz ................ G06F 18/22 |
| | | 382/180 |
| 2017/0094288 A1* | 3/2017 | Hannuksela ......... H04N 19/187 |
| 2018/0278957 A1* | 9/2018 | Fracastoro ............. H04N 19/60 |

(Continued)

OTHER PUBLICATIONS

Grundmann et al., "Efficient Hierarchical Graph-Based Video Segmentation," 2010 IEEE Computer Society Conference On Computer Vision and Pattern Recognition, 2010, pp. 2141-2148.

(Continued)

*Primary Examiner* — Matthew David Kim
(74) *Attorney, Agent, or Firm* — NORTON ROSE FULBRIGHT US LLP; Gerard A. Messina

(57) ABSTRACT

A method for lossily compressing a sequence of video frames into a representation, wherein each video frame comprises pixels that carry color values. The method includes: segmenting each video frame into superpixels, wherein these superpixels are groups of pixels that share at least one predetermined common property; assigning, to each superpixel in each video frame, at least one attribute derived from the pixels belonging to the respective superpixel; and combining superpixels as nodes in a graph representation, wherein superpixels in a same video frame are connected by spatial edges associated with at least one quantity that is a measure for a distance between these superpixels; and in response to superpixels in adjacent video frames in the sequence meeting at least one predetermined relatedness criterion, these superpixels are connected by temporal edges.

13 Claims, 2 Drawing Sheets

(56) References Cited

U.S. PATENT DOCUMENTS

| | | | | |
|---|---|---|---|---|
| 2019/0058887 A1* | 2/2019 | Wang | ..................... | G06V 20/46 |
| 2020/0175325 A1* | 6/2020 | Nie | ..................... | G06V 20/698 |
| 2020/0184655 A1* | 6/2020 | Xiang | ..................... | G06T 7/66 |
| 2021/0350620 A1* | 11/2021 | Bronstein | ............... | G06N 20/00 |
| 2022/0245802 A1* | 8/2022 | Wang | ..................... | G16H 50/20 |
| 2022/0261590 A1* | 8/2022 | Brahma | ................. | G06V 20/56 |
| 2022/0284552 A1* | 9/2022 | Yang | .......................... | G06T 5/80 |
| 2022/0400200 A1* | 12/2022 | Lagnado | ................ | H04N 23/60 |
| 2023/0065773 A1* | 3/2023 | Dimitriou | ............ | G06V 10/761 |
| 2024/0404254 A1* | 12/2024 | Ouyang | ............... | G06V 10/806 |

OTHER PUBLICATIONS

Zhang et al., "Saliency-Guided Unsupervised Feature Learning for Scene Classification," IEEE Transactions On Geoscience and Remote Sensing, vol. 53, No. 4, 2015, pp. 2175-2184.

Yu et al., "Efficient Video Segmentation Using Parametric Graph Partitioning," 2015 IEEE International Conference On Computer Vision, 2015, pp. 3155-3163.

Rogers, "Normalizing the X.Y Coordinates for Different Image Sizes," 2019, pp. 1. https://forum.image.sc/t/normalizing-the-x-y-coordinates-for-different-image-sizes/24160.

Lv, "An Improved Slic Superpixels Using Reciprocal Nearest Neighbor Clustering," International Journal of Signal Processing, Image Processing and Pattern Recognition, vol. 8, No. 5, 2015, pp. 239-248.

Jain et al., "Supervoxel-Consistent Foreground Propagation in Video," ECCV 2014, Part IV, NCS 8692, 2014, pp. 656-671.

Guo et al., "Depth Estimation From a Single Image in Pedestrian Candidate Generation," 2016 IEEE 11th Conference On Industrial Electronics and Applications (ICIEA), 2016, pp. 1005-1008.

* cited by examiner

LOSSY COMPRESSION OF VIDEO CONTENT INTO A GRAPH REPRESENTATION

CROSS REFERENCE

The present application claims the benefit under 35 U.S.C. § 119 of European Patent Application No. EP 21 20 1632.3 filed on Oct. 8, 2021, which is expressly incorporated herein by reference in its entirety.

FIELD

The present invention relates to data compression for video content that may, inter alia, be used as a pre-processing step for processing the video content using graph neural networks.

BACKGROUND INFORMATION

Many video processing tasks are performed using deep neural networks. Such tasks require a large amount of computing resources, and in particular memory. One reason for this is that a sequence of video frames is an inherently high-dimensional type of input. For example, a typical neural network designed for video processing is fed with a video clip of 16 frames as input. This implies that a typical neural network for video processing has many more parameters than its image-based counterpart.

SUMMARY

The present invention provides a method for lossily compressing a sequence of video frames. Each such video frame comprises pixels that carry color values. By lossy compression, it is meant that the content of the original sequence of video frames is not directly and unambiguously derivable from the compressed representation.

According to an example embodiment of the present invention, in the course of the method, each video frame is segmented into superpixels. These superpixels are groups of pixels that share at least one predetermined common property, such as a similar color or intensity value. To each superpixel, at least one attribute derived from the pixels belonging to the respective superpixel is assigned.

For example, an attribute assigned to each superpixel may comprise a minimum color value, a maximum color value, a mean color value, a median color value, or another aggregate value derived from the color values of pixels belonging to the superpixel.

In the following, the sought representation is then created from the superpixels and the one or more attributes assigned to them. This alone already reduces the dimensionality of the sequence of video frames by a great deal. Typically, there are about 1000 times more original pixels in each video frame than there are superpixels after the segmenting step.

Superpixels are combined as nodes in a graph representation. That is, each node in the graph corresponds to one superpixel. The nodes (superpixels) are connected by two types of edges, namely spatial edges and temporal edges.

Specifically, superpixels in a same video frame are connected by spatial edges associated with at least one quantity that is a measure for a distance between these superpixels. That is, typically every superpixel in a video frame is connected to every other superpixel in the same video frame, but the connections of a given superpixel to the other superpixels will carry different quantities corresponding to different distances. The distance that is being measured may, for example, be a spatial distance in the coordinate system of the video frame. But the distance may, for example, also relate to a difference between the contents of the respective superpixels.

In response to superpixels in adjacent video frames in the sequence meeting at least one predetermined relatedness criterion, these superpixels are connected by temporal edges. That is, a superpixel in one video frame is typically not connected to every superpixel in an adjacent video frame. Rather, a given superpixel might be connected to only a few superpixels, or even only one superpixel, in the adjacent video frame. There may even be superpixels that are not connected to any other superpixel in an adjacent frame.

It should be noted that, from a purely graph-theoretic point of view, there is no difference between spatial edges and temporal edges. The union set of the set of spatial edges on the one hand and the set of temporal edges on the other hand makes up the total set of edges, and this total set of edges, together with the set of nodes, uniquely defines the graph representation. However, the distinction between spatial edges and temporal edges will be kept up in the following because they are created differently and also relate to different aspects of the original sequence of video frames.

In this manner, the number of independent parameters that characterizes the representation is greatly reduced compared with the number of parameters that characterizes the original input. Let T, C, H and W be the number of frames in the sequence, the number of color channels in each frame, the height of each frame, and the width of each frame, respectively. Then the video sequence is characterized by $T \cdot C \cdot H \cdot W$ independent parameters that all have to be processed by, e.g., a neural network for further processing in a downstream task.

Now let S be the number of superpixels in each frame. Then there are $S^2-S$ spatial edges between the superpixels in each frame. Each spatial edge requires two parameters to denote, e.g., a spatial distance in the plane of the video frame. Also, if the distance is a pure spatial distance, the parameters that characterize the spatial edges will be the same for all video frames, so they can be re-used. If every superpixel is connected to only at most one other superpixel in an adjacent video frame, there are at most $(T-1) \cdot S$ temporal edges. Moreover, the $T \cdot S$ superpixels as such require $C \cdot T \cdot S$ parameters to characterize. Then the total number of parameters is $2 \cdot (S^2-S+(T-1) \cdot S)+C \cdot T \cdot S$. This is usually a lot less than $T \cdot C \cdot H \cdot W$ because the number S of superpixels is chosen such that $S^2 \ll H \cdot W$.

Another advantage is that by virtue of the construction scheme for spatial and temporal edges presented above, the graph representation comprises notions of optical flow and over-segmentation. Thus, the strong prior knowledge found in previous research regarding optical flow and over-segmentation is re-used. For example, considering the optical flow has led to a dramatic improvement in action recognition in videos. Also, processing the input for a neural network by over-segmentation using superpixels is particularly useful because the number of elements of the input, and thus the time and memory consumption of the processing in the neural network, is greatly reduced, while only little detail is lost.

In a particularly advantageous embodiment of the present invention, a measure for a distance between superpixels comprises an Euclidean distance between spatial coordinates of superpixels. For example, the distance $d_{i,j}^t$ between superpixels i and j in a frame t may be computed as $$d_{i,j}^t = \sqrt{\left(\frac{y(R_{t,i}) - y(R_{t,j})}{H}\right)^2 + \left(\frac{x(R_{t,i}) - x(R_{t,j})}{W}\right)^2}.$$

Herein, $R_{t,i}$ and $R_{t,j}$ are graph nodes representing superpixels i and j in frame t, respectively. The functional notations $x(R_{t,i})$, $y(R_{t,i})$, $x(R_{t,j})$ and $y(R_{t,j})$ mean spatial coordinates x, y of superpixels corresponding to graph nodes $R_{t,i}$ and $R_{t,j}$. Normalizing the coordinates of the superpixels to H and W removes information regarding the resolution of the video frame, which is irrelevant for many downstream tasks such as classification of video streams, from the distance measure $d_{i,j}^t$. Thus, while this distance measure provides information about the spatial relationship between superpixels, it is invariant to rotations and image flips. The consequence of this is that in a downstream task where the representation is processed by a neural network, the training data does not need to be augmented with rotated or flipped training samples in order to teach the network to produce an output that is invariant with respect to a rotated or flipped input.

Thus, the set $E_t^s$ of spatial edges connecting nodes corresponding to superpixels in the video frame t may be written as $$E_t^s = \{e_{i,j}^t = (R_{t,i}, R_{t,j}) | i,j \in [S] \wedge i < j\},$$

wherein [S] denotes the set of S indices of superpixels derived from the original video frame t. Each edge $e_{i,j}^t$ may be associated with the respective distance $d_{i,j}^t$.

In particular, spatial coordinates of a superpixel may comprise spatial coordinates of a centroid of the pixels belonging to this superpixel. A centroid may, for example, be determined as a barycenter of the pixels belonging to the superpixel.

In another advantageous embodiment of the present invention, a measure for a distance between superpixels comprises a difference computed between histograms of properties of individual pixels belonging to the respective superpixels. For example, statistic moments or quantities, or aggregates of such statistic moments or quantities, may be computed for each histogram, and from the results obtained for two histograms, the difference may be evaluated. In this manner, the distance measure highlights another aspect of the semantic meaning of the video frame, namely which superpixels belong to which objects in the video frame. Different objects are likely to have different colors and/or textures, which should be visible in statistics of histograms that somehow dependent on color and/or texture.

In a particularly advantageous embodiment of the present invention, the relatedness criterion that is used for determining temporal edges comprises a proximity with respect to spatial coordinates of the superpixels, and/or a similarity of attributes assigned to these superpixels. Thus, the distance $d_{i,j}^{t_q \rightarrow t_p}$ between a superpixel i in video frame $t_q$ and a superpixel j in video frame $t_p$ may be computed as:

$$d_{i,j}^{t_q \rightarrow t_p} = \sqrt{\left(\frac{y(R_{t_q,i}) - y(R_{t_p,j})}{H}\right)^2 + \left(\frac{x(R_{t_q,i}) - x(R_{t_p,j})}{W}\right)^2}.$$

For example, the relatedness criterion may comprise a threshold value for this distance measure $d_{i,j}^t$, and/or for a similarity of attributes (such as median color) assigned to these subpixels.

In a particularly advantageous embodiment of the present invention, given a first superpixel in a video frame, superpixels from the adjacent video frame in the sequence that meet a first relatedness criterion with respect to proximity are pre-selected. Then, from these pre-selected superpixels, a superpixel whose assigned attributes are most similar to those of the first superpixel is chosen as a superpixel to connect to the first superpixel by a temporal edge. In this manner, the proximity criterion becomes the dominant one. For example, given a superpixel i in video frame t, a neighborhood $\mathcal{N}_{t,i}$ of superpixels j in adjacent video frame t+1 may be computed as $$\mathcal{N}_{t,i} = \{R_{t+1,j} | d_{i,j}^t < d_P\},$$

where $d_P$ is a threshold value for the proximity. Out of this neighborhood $\mathcal{N}_{t,i}$, a superpixel j with attributes closest to those of the given superpixel i may then be chosen for defining a temporal edge, and this may be performed starting from all superpixels in video frame t. Thus, the set $E_{t \rightarrow t+1}^t$ of all temporal connections originating from superpixels in video frame t may be computed as $$E_{t \rightarrow t+1}^t = \left\{ R_{t,i}, \underset{R_{t+1,j} \in \mathcal{N}_{t,i}}{\mathrm{argmin}} \, |a(R_{t,i}) - a(R_{t+1,j})|_2 \, \middle| \, i \in [S] \right\}.$$

Herein, $a(R_{t,i})$ denotes an attribute (such as a median color value) assigned to superpixel i in video frame t, and $a(R_{t+1,j})$ denotes an attribute assigned to superpixel j in adjacent video frame t+1. In this example, temporal edges are only formed towards superpixels j in the adjacent video frame t+1 whose attributes are most similar to the attributes of the superpixel i in the video frame t.

It should be noted that a relatedness criterion with respect to proximity is not limited to an upper threshold value. Rather, for example, depending on the application, a lower threshold value may be set. I.e., to be in the "neighborhood", superpixels in the adjacent video frame need to be at least a certain distance away from the starting superpixel. For example, this may shift the focus to an analysis of relations between movements of different objects in the sequence of video frames.

Also, it is not strictly required that proximity is the dominant criterion. For example, it is also possible to compute a weighted sum between proximity and similarity of attributes.

In a further advantageous embodiment of the present invention, in response to determining that a superpixel belongs to a background or other area of the video frame that is not relevant to an application at hand, excluding and/or removing this superpixel from the graph representation. In this manner, the number of independent parameters of the graph representation may be reduced even further.

In a further particularly advantageous embodiment of the present invention, the graph representation is provided to a graph neural network, GNN. From the GNN, a processing result for the sequence of video frames. For example, the GNN may be a graph convolutional network, GCN. The basic form of a GCN uses simple aggregation functions to obtain a node representation given its neighbors, such as average and summation, and was rapidly extended to more complex architectures which involve more sophisticated aggregation functions. On top of the savings in memory and computation time due to the reduced number of independent parameters in the input, GNNs, and in particular GCNs, are more memory-efficient than the convolutional networks that are usually used to process images and sequences of video frames as input. The reason is that a GCN is less complex than a convolutional network that is able to handle a similarly-sized task.

In a further advantageous embodiment of the present invention, an actuation signal is computed from the processing result obtained from the GNN. A vehicle, a quality inspection system, a classification system, and/or a surveillance system, is actuated with the actuation signal. These systems particularly benefit from the smaller memory requirements of the GNN. Also, the reduced number of parameters reduces the tendency to overfit to the training data. This means that the network generalizes better to unseen input data, causing the respective actuated system to react in an appropriate manner to unseen situations.

In further advantageous embodiment of the present invention, media content or other information stored in a database in association with the graph representation is retrieved from the database. That is, the graph representation may be used as a key to retrieve this information. The graph representation is small, which means that it does not require much space in the database and may be looked up faster. Also, the graph representation is a good summary of the content of the sequence of video frames, which causes the video that is retrieved from the database to be at least similar to the video from which the graph representation was created.

The method may be wholly or partially computer-implemented. The present invention therefore also relates to one or more computer programs with machine-readable instructions that, when executed on one or more computers, cause the one or more computers to perform the method. In this context, control units for vehicles and other embedded systems that are able to execute machine-readable instructions are to be regarded as computers as well.

The present invention therefore also relates to a non-transitory storage medium, and/or to a download product, with the one or more computer programs. A download product is a product that may be sold in an online shop for immediate fulfillment by download. The present invention also provides one or more computers and/or compute instances with the one or more computer programs, and/or with the one or more non-transitory machine-readable storage media and/or download products.

Further advantageous embodiments of the present invention are detailed and illustrated in the following using Figures without any intention to limit the scope of the present invention.

DETAILED DESCRIPTION OF EXAMPLE EMBODIMENTS

Figure 1:
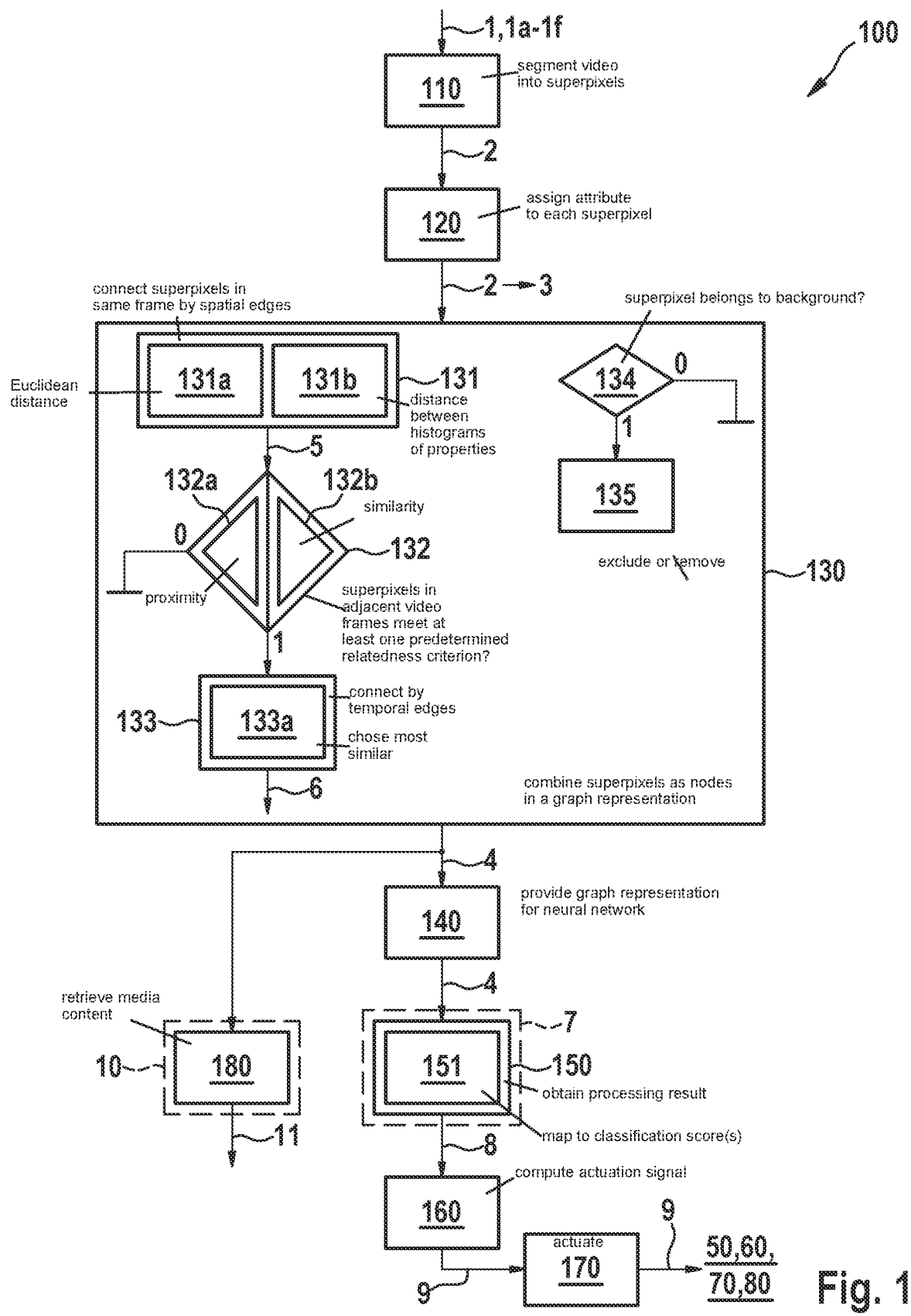
FIG. 1 shows an exemplary embodiment of the method 100 for compressing a sequence 1 of video frames 1*a*-1*f* into a representation 4, according to the present invention.

FIG. 1 is a schematic flow chart of an exemplary embodiment of the method 100 for lossily compressing a sequence 1 of video frames 1*a*-1*f* into a representation 4.

In step 110, each video frame 1*a*-1*f* is segmented into superpixels 2. These superpixels 2 are groups of pixels that share at least one predetermined common property.

In step 120, at least one attribute 3 derived from the pixels belonging to the respective superpixel 2 is assigned to each superpixel 2 in each video frame 1*a*-1*f*.

In step 130, the superpixels 2 are combined as nodes in a graph representation 4.

In particular, according to block 131, superpixels 2 in a same video frame 1*a*-1*f* are connected by spatial edges 5 associated with at least one quantity that is a measure for a distance between these superpixels 2. This measure for a distance may, according to block 131*a*, comprise an Euclidean distance between spatial coordinates of superpixels 2. Alternatively or in combination to this, according to block 131*b*, the measure for a distance may comprise a difference computed between histograms of properties of individual pixels belonging to the respective superpixels 2.

According to block 132, it is checked whether superpixels 2 in adjacent video frames 1*a*-1*f* in the sequence 1 meet at least one predetermined relatedness criterion. If this criterion is met (truth value 1), the superpixels 2 are connected by temporal edges 6.

According to block 132*a*, the relatedness criterion may comprise a proximity with respect to spatial coordinates of the superpixels 2, and/or a similarity of attributes 3 assigned to these superpixels 2.

Alternatively or in combination to this, according to block 132*b*, given a first superpixel 2 in a video frame 1*a*-1*f*, superpixels 2 from the adjacent video frame 1*a*-1*f* in the sequence 1 that meet a first relatedness criterion with respect to proximity may be pre-selected. From these pre-selected superpixels 2, according to block 133*a*, a superpixel whose assigned attributes are most similar to those of the first superpixel 2 may be chosen as a superpixel 2 to connect to the first superpixel 2 by a temporal edge 6.

According to block 134, it may be checked whether a superpixel 2 belongs to a background or other area of the video frame 1*a*-1*f* that is not relevant to an application at hand, as measured by any suitable predetermined criterion. If this is the case (truth value 1), according to block 135, the superpixel 2 may be excluded and/or removed from the graph representation 4.

In step 140, the graph representation 4 is provided to a graph neural network, GNN 7. In step 150, a processing result 8 for the sequence 1 of video frames 1*a*-1*f* is obtained from the GNN 7. That is, the graph representation 4 takes the place of the original sequence 1 of video frames 1*a*-1*f* that would have otherwise have been the input to a neural network Also, the GNN 7 takes the place of a different neural network, such as a convolutional neural network, that would otherwise have been used.

In particular, according to block 151, the GNN 7 may be configured to map the graph representation 4 to one or more classification scores with respect to a given set of available classes.

In step 160, from the processing result 8 obtained from the GNN 7, an actuation signal 9 is computed. In step 170, a vehicle 50, a quality inspection system 60, a classification system 70, and/or a surveillance system 80, may be actuated with the actuation signal 9.

Furthermore, in step 180, media content or other information 11 stored in at least one database 10 in association with the graph representation 4 may be retrieved from the at least one database 10 using the graph representation 4 as a key.

Figure 2:
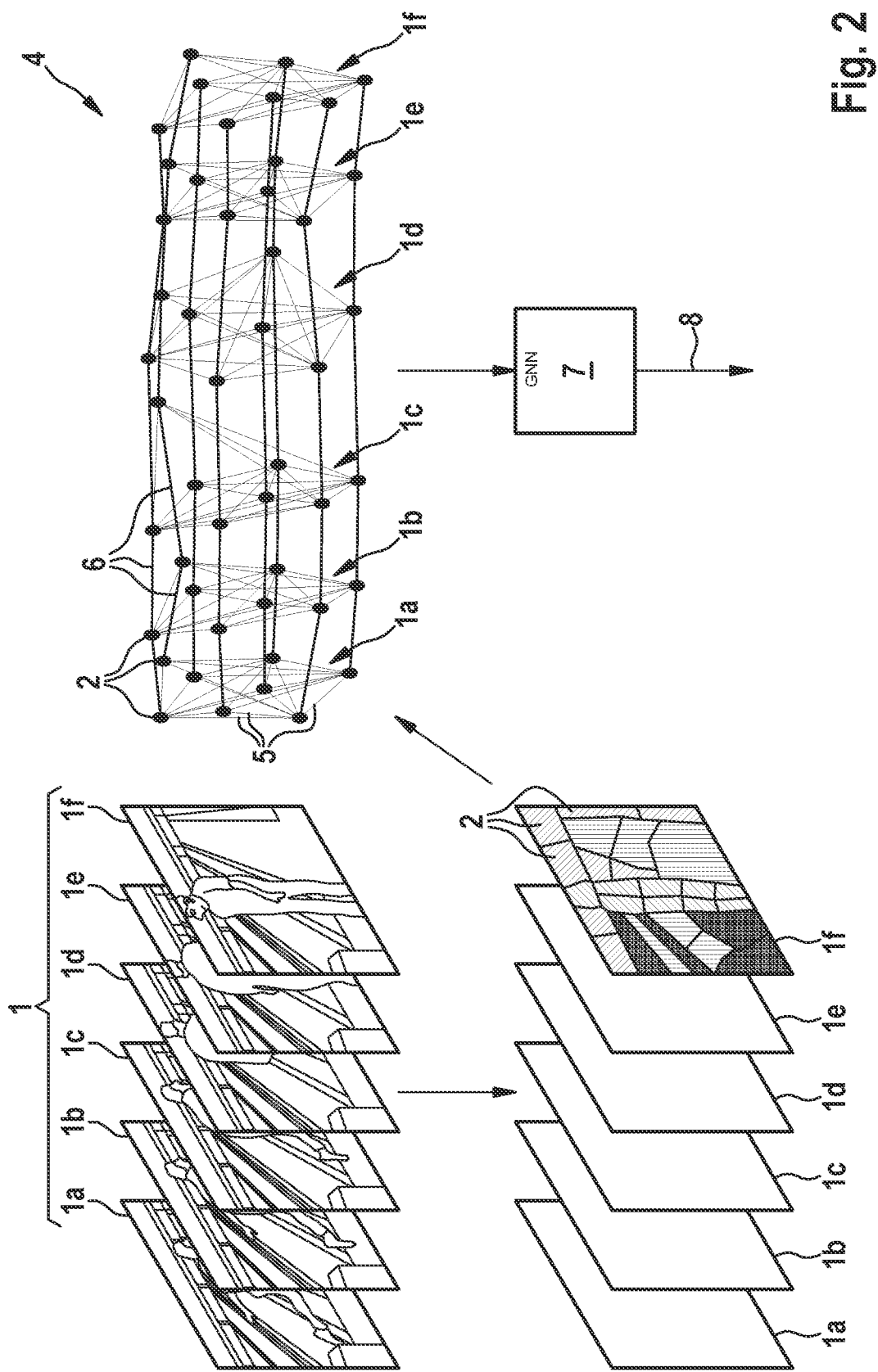
FIG. 2 illustrates an exemplary composition of a graph representation 4 from a sequence 1 of video frames 1*a*-1*f*, according to the present invention.

FIG. 2 illustrates on one example how a sequence 1*a*-1*f* of video frames 1 may be transformed into a graph representation 4. First, each video frame 1*a*-1*f* is segmented into superpixels 2. This is exemplarily shown for the video frame 1f that is on top of the pile of frames 1a-1f. The segmentation into superpixels 2 may be seen as a rough sketch or summary of the scene depicted in the respective video frame 1a-1f that In the graph representation 4, each superpixel 2 becomes one node. Within each video frame 1a-1f, each superpixel 2 is connected to all other superpixels 2 in this video frame 1a-1f by means of spatial edges 5. Because these spatial edges 5 are associated with at least one quantity that is a measure for a distance between the superpixels 2, some spatial edges 5 may be more important than others. But the spatial edges 5 are all present. Therefore, in the graph representation 4, each video frame 1a-1f remains discernible as a sub-graph of nodes connected by spatial edges 5.

Temporal edges 6 connect superpixels 2 in adjacent video frames 1a-1f. Between a first superpixel 2 in one video frame 1a-1f and a second superpixel 2 in an adjacent video frame 1a-1f, a temporal edge 6 is established only if a predetermined relatedness criterion is met between these superpixels 2. In the example shown in FIG. 2, each superpixel 2 is only connected to one other superpixel 2 in a subsequent frame 1a-1f by means of a temporal edge 6.

The graph representation 4 is inputted into a GNN 7. The processing result 8 obtained from the GNN 7, which may, for example, comprise classification scores with respect to one or more classes, may then be used in the downstream task.

What is claimed is:

1. A method for lossily compressing a sequence of video frames into a representation, wherein each video frame for the video frames includes pixels that carry color values, the method comprising the following steps:
   segmenting each video frame into superpixels, wherein the superpixels are groups of pixels that share at least one predetermined common property;
   assigning, to each superpixel in each video frame, at least one attribute derived from the pixels belonging to the respective superpixel;
   combining superpixels as nodes in a graph representation, wherein:
      superpixels in a same video frame are connected by spatial edges associated with at least one quantity that is a measure for a distance between the superpixels in the same video frame, and
      in response to superpixels in adjacent video frames in the sequence meeting at least one predetermined relatedness criterion, the superpixels in the adjacent video frames are connected by temporal edges, wherein the relatedness criterion is a threshold value of a distance between the superpixels in adjacent video frames in the sequence, wherein the temporal edges connect the superpixels in the adjacent video frames when the relatedness criterion is met between the superpixels;
   providing the graph representation to a graph neural network (GNN); and
   obtaining, from the GNN, a processing result for the sequence of video frames.

2. The method of claim 1, wherein the attribute assigned to each superpixel includes a minimum color value or a maximum color value or a mean color value or a median color value or another aggregate value derived from the color values of pixels belonging to the superpixel.

3. The method of claim 1, wherein the measure for the distance between superpixels includes an Euclidean distance between spatial coordinates of superpixels.

4. The method of claim 3, wherein the spatial coordinates of each superpixel include spatial coordinates of a centroid of the pixels belonging to the superpixel.

5. The method of claim 1, wherein the measure for the distance between respective superpixels includes a difference computed between histograms of properties of individual pixels belonging to the respective superpixels.

6. The method of claim 1, wherein the relatedness criterion includes a proximity with respect to spatial coordinates of the superpixels, and/or a similarity of attributes assigned to these superpixels.

7. The method of claim 1, further comprising:
   pre-selecting, given a first superpixel in a video frame, superpixels from an adjacent video frame in the sequence that meet a first relatedness criterion with respect to proximity; and
   choosing, from the pre-selected superpixels, a superpixel whose assigned attributes are most similar to those of the first superpixel as a superpixel to connect to the first superpixel by one of the temporal edge.

8. The method of claim 1, further comprising: in response to determining that a superpixel of the superpixels belongs to a background or other area of the video frame that is not relevant to an application at hand, excluding and/or removing the superpixel from the graph representation.

9. The method of claim 1, wherein the GNN is configured to map the graph representation to one or more classification scores with respect to a given set of available classes.

10. The method of claim 1, further comprising:
    computing, from the processing result obtained from the GNN, an actuation signal; and
    actuating, with the actuation signal, a vehicle and/or a quality inspection system and/or a classification system and/or a surveillance system.

11. The method of claim 1, further comprising:
    retrieving, from at least one database, media content or other information, stored in association with the graph representation.

12. A non-transitory machine-readable storage medium on which is stored a computer program for lossily compressing a sequence of video frames into a representation, wherein each video frame for the video frames includes pixels that carry color values, the computer program, when executed by one or more computers, causing the one or more computers to perform the following steps:
    segmenting each video frame into superpixels, wherein the superpixels are groups of pixels that share at least one predetermined common property;
    assigning, to each superpixel in each video frame, at least one attribute derived from the pixels belonging to the respective superpixel; and
    combining superpixels as nodes in a graph representation, wherein:
       superpixels in a same video frame are connected by spatial edges associated with at least one quantity that is a measure for a distance between the superpixels in the same video frame,
       in response to superpixels in adjacent video frames in the sequence meeting at least one predetermined relatedness criterion, the superpixels in the adjacent video frames are connected by temporal edges, wherein the relatedness criterion is a threshold value of a distance between the superpixels in adjacent video frames in the sequence, wherein the temporal edges connect the superpixels in the adjacent video frames when the relatedness criterion is met between the superpixels;

providing the graph representation to a graph neural network (GNN); and obtaining, from the GNN, a processing result for the sequence of video frames.

13. One or more computers configured to lossily compress a sequence of video frames into a representation, wherein each video frame for the video frames includes pixels that carry color values, the one or more computers configured to:

segment each video frame into superpixels, wherein the superpixels are groups of pixels that share at least one predetermined common property;

assign, to each superpixel in each video frame, at least one attribute derived from the pixels belonging to the respective superpixel; and combine superpixels as nodes in a graph representation, wherein:

superpixels in a same video frame are connected by spatial edges associated with at least one quantity that is a measure for a distance between the superpixels in the same video frame, in response to superpixels in adjacent video frames in the sequence meeting at least one predetermined relatedness criterion, the superpixels in the adjacent video frames are connected by temporal edges, wherein the relatedness criterion is a threshold value of a distance between the superpixels in adjacent video frames in the sequence, wherein the temporal edges connect the superpixels in the adjacent video frames when the relatedness criterion is met between the superpixels;

providing the graph representation to a graph neural network (GNN); and obtaining, from the GNN, a processing result for the sequence of video frames.

* * * * *